United States Patent [19]

Eschbach

[11] Patent Number: 5,521,718
[45] Date of Patent: May 28, 1996

[54] EFFICIENT ITERATIVE DECOMPRESSION OF STANDARD ADCT-COMPRESSED IMAGES

[75] Inventor: Reiner Eschbach, Webster, N.Y.

[73] Assignee: Xerox Corporation, Stamford, Conn.

[21] Appl. No.: 349,594

[22] Filed: Dec. 5, 1994

[51] Int. Cl.$^6$ .................................................. H04N 9/79
[52] U.S. Cl. ........................ 358/432; 358/430; 358/433
[58] Field of Search ......................... 348/404; 382/250, 382/248, 239, 268, 233, 56; 358/430, 432, 433

[56] References Cited

U.S. PATENT DOCUMENTS

| | | |
|---|---|---|
| 4,999,705 | 3/1991 | Puri . |
| 5,001,559 | 3/1991 | Gonzales et al. ........................ 358/133 |
| 5,049,991 | 9/1991 | Niihara .................................... 358/136 |
| 5,321,522 | 6/1994 | Eschbach ................................. 358/433 |
| 5,321,552 | 6/1994 | Eschbach . |
| 5,359,676 | 10/1994 | Fan . |

FOREIGN PATENT DOCUMENTS 0590922 6/1994 European Pat. Off. .

OTHER PUBLICATIONS

Chen et al; "Adaptive Coding of Monochrome and Color Images"; IEEE Trans. Comm.; vol. COM-25, No. 11, Nov. 1977; pp. 1285-1292.

Primary Examiner—Edward L. Coles, Sr.
Assistant Examiner—Shahreen Ali
Attorney, Agent, or Firm—Mark Costello

[57] ABSTRACT

A method of decompressing a document image compressed with JPEG ADCT and a subsequent statistical encoding method, includes an iterative processing step, which filters the image to correct for compression/decompression artifacts, and subsequently checks the ADCT coefficients of the filtered image to determine whether the filtered image is a possible one, given the received original ADCT coefficients and Q-Table description. In such an arrangement, the iterative process step can be terminated at a preselected number of iterations based on the measured size of the statistical encoding prior to removing the statistical encoding.

5 Claims, 6 Drawing Sheets

| 14 | 132 | 105 | 10 |
|----|-----|-----|-----|
| 6 | 155 | 166 | 161 |
| 11 | 142 | 67 | 61 |
| 8 | 6 | 6 | 6 |

| 0 | 3 | 1 | 0 |
|---|---|---|---|
| 0 | 3 | 3 | 3 |
| 0 | 3 | 0 | 0 |
| 0 | 0 | 0 | 0 |

EFFICIENT ITERATIVE DECOMPRESSION OF STANDARD ADCT-COMPRESSED IMAGES

The present invention is directed to a method of efficiently iteratively decompressing images compressed in accordance with the currently proposed JPEG ADCT (adaptive discrete cosine transform) standard, and more particularly, a method of reducing decompression artifacts in document-type images resulting from decompression of standard JPEG ADCT compressed images, while efficiently processing such images.

CROSS REFERENCE

Cross reference is made to co-pending U.S. patent application Ser. No. 07/956,128 entitled "Decompression of Standard ADCT-Compressed Images" by R. Eschbach, filed Oct. 2, 1992, assigned to the same assignee as the present invention. Priority is claimed therefrom to the extent available.

BACKGROUND OF THE INVENTION

Data compression is required in data handling processes, where too much data is present for practical applications using the data. Commonly, compression is used in communication links, where the time to transmit is long, or where bandwidth is limited. Another use for compression is in data storage, where the amount of media space on which the data is stored can be substantially reduced with compression. Yet another application is a digital copier where an intermediate storage is used for collation, reprint or any other digital copier functions. Generally speaking, scanned images, i.e., electronic representations of hard copy documents, are commonly large, and thus are desirable candidates for compression.

ADCT (Adaptive Discrete Cosine Transform, described for example, by W. H. Chen and C. H. Smith, in "Adaptive Coding of Monochrome and Color Images", IEEE Trans. Comm., Vol. COM-25, pp. 1285–1292, November 1977), as the method disseminated by the JPEG committee will be called in this application, is a lossy system which reduces data redundancies based on pixel to pixel correlations. Generally, in images, on a pixel to pixel basis, an image does not change very much. An image therefore has what is known as "natural spatial correlation". In natural scenes, correlation is generalized, but not exact. Noise makes each pixel somewhat different from its neighbors.

Co-pending U.S. patent application Ser. No. 07/956,128 entitled "Decompression of Standard ADCT-Compressed Images" by R. Eschbach, filed Oct. 2, 1992 and assigned to the same assignee as the present invention (published at EP 590922, on Apr. 6, 1994) and U.S. Pat. No. 5,359,676 to Fan, teach variations on an iterative ADCT decompression method that, after filtering, iteratively checks to assure that the filtered and decompressed image is an image that could have been derived from the original image. During each iteration, a check is made, and, if required, an adjustment is made to the ADCT coefficients, if a possible image is not represented. These references suggested that every block of coefficients is operated upon in an identical manner, and therefore subject to at least one iteration by the system described. This approach works well in hardware implementation, because no overhead in terms of time is generated by iteratively processing blocks that do not need to be checked. If the method of these references is implemented in software, a heavy overhead penalty accrues in terms of time, because processing time is directly dependent upon the number of iterations performed in the decompression process. Accordingly, software performance might be improved if the number of iterations could be reduced. Particularly, iterations where improvement in the image are unlikely to occur, are candidates for reduction.

Figure 1:
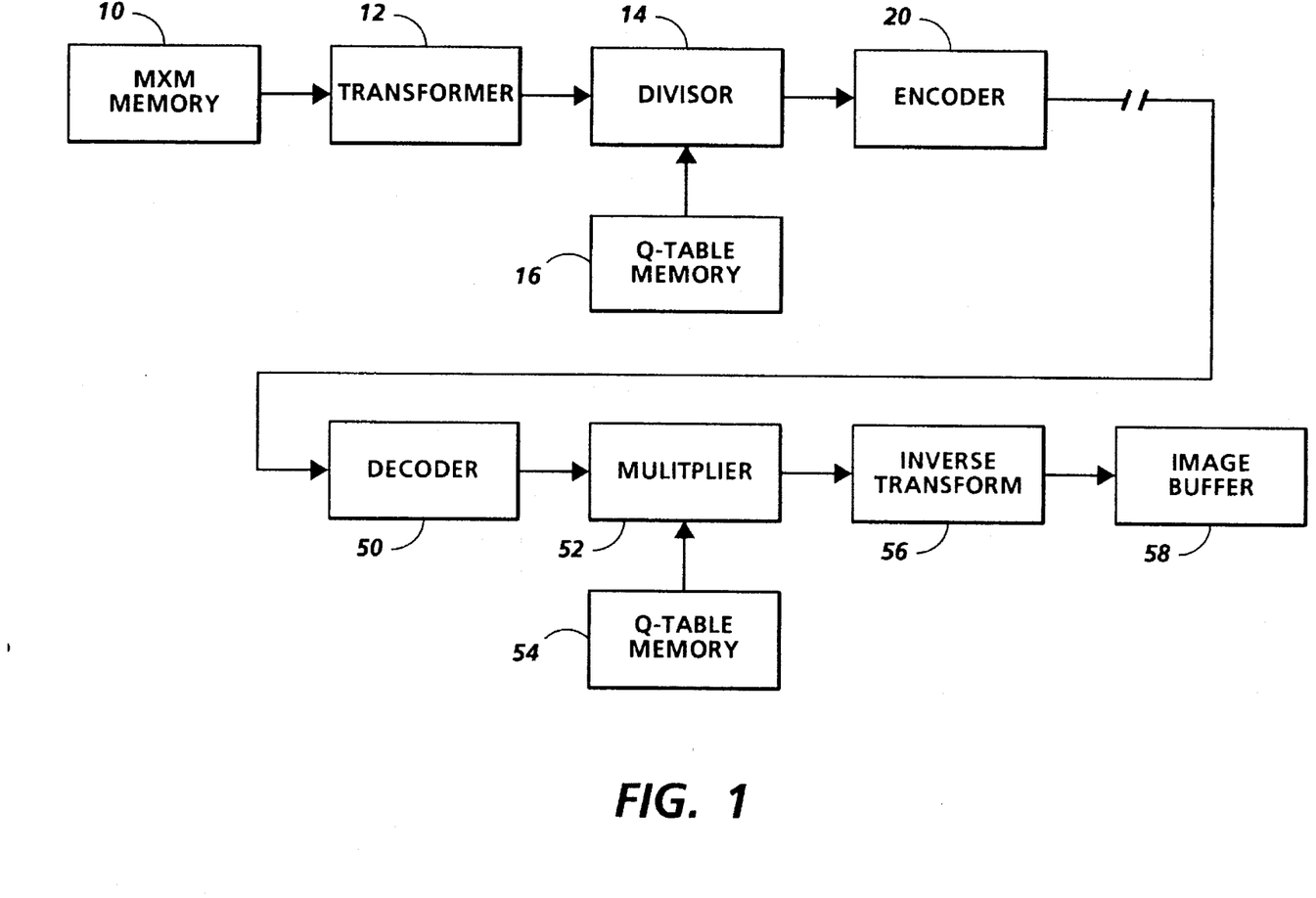
FIG. 1 shows a functional block diagram for the prior art ADCT compression/recompression process.

Generally, as shown in FIG. 1, a JPEG ADCT compression and decompression system is illustrated. A more complete discussion may be had by referencing U.S. Pat. No. 5,321,522 to Eschbach, co-pending U.S. patent application Ser. No. 07/956,128, entitled "Decompression of Standard ADCT-Compressed Images" by R. Eschbach, filed Oct. 2, 1992 and assigned to the same assignee as the present invention (published at EP 590922, on Apr. 6, 1994) and U.S. Pat. No. 5,359,676 to Fan, all incorporated herein by reference. Initially provided is tile memory 10 storing an M×M tile of the image. From the portion of the image stored in tile memory, the discrete cosine transform (DCT), a frequency space representation of the image is formed at transformer 12. Hardware implementations are available, such as the C-Cube Microsystems CL550A JPEG image compression processor, which operates in either the compression or the decompression mode according to the proposed JPEG standard. As we will see below, the primary focus of the invention is in software processing, although hardware implementations may be improved, as well. A divisor/quantization device 14 is used, from a set of values referred to as a Q-Table, stored in a Q table memory 16, so that a distinct Q table value is divided into the DCT value, returning the integer portion of the value as the quantized DCT value. A Huffman encoder 20 using statistical encoding the quantized DCT values to generate the compressed image that is output for storage, transmission, etc.

ADCT transforms are well known, and hardware exists to perform the transform on image data, e.g., U.S. Pat. No. 5,049,991 to Niihara, U.S. Pat. No. 5,001,559 to Gonzales et al., and U.S. Pat. No. 4,999,705 to Purl. The primary thrust of these particular patents, however, is moving picture images, and not document images.

To decompress the now-compressed image, and with reference to FIG. 1, a series of functions or steps are followed to reverse of the process described. The Huffman encoding is removed at decoder 50. The image signal now represents the quantized DCT coefficients, which are multiplied at signal multiplier 52 by the Q table values in memory 54 in a process inverse to the compression process. At inverse transformer 56, the inverse transform of the discrete cosine transform is derived, and the output image in the spatial domain is stored at image buffer 58.

Figure 2:
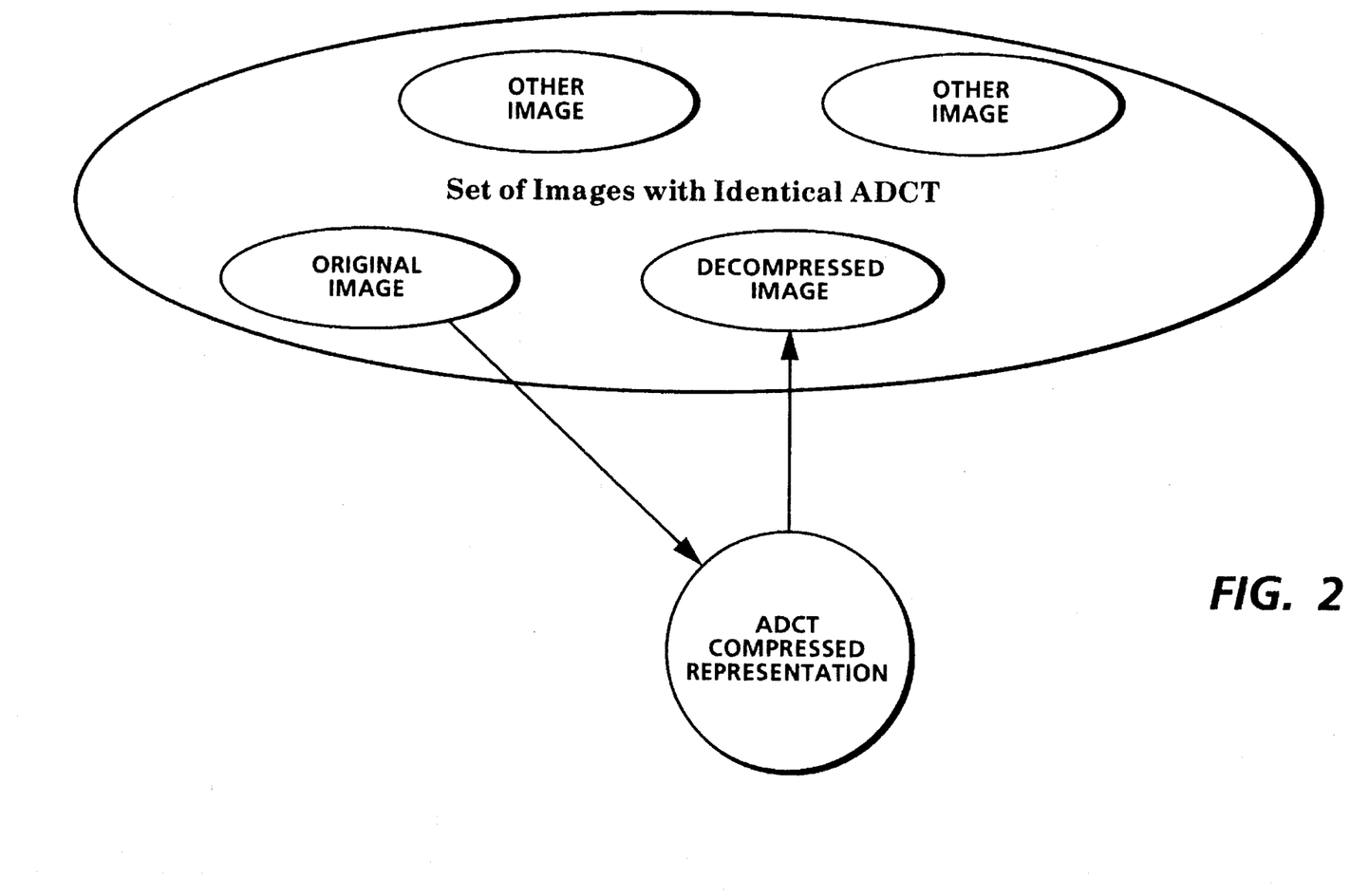
FIG. 2 shows the principle of a single set of quantized ADCT values representing a class of distinct and possible images.

With reference now to FIG. 2, a general overview of the compression/decompression process is shown. There exists a set of images which are distinct from each other, but which are similar in the respect that each image in the set compresses to the same ADCT representation. Therefore, any decompression process should produce an output image which is within this set. The knowledge of the set of possible images is coded by the Q-Table used. Since the Q-Table represents divisors of the discrete quantized transform coefficients, and as a result of the quantization process fractional portions of each coefficient are discarded, then the set of possible images represents all those images from which the same quantized transform coefficients can be determined about a range of possible coefficient values for each term of the transform.

Figure 3:
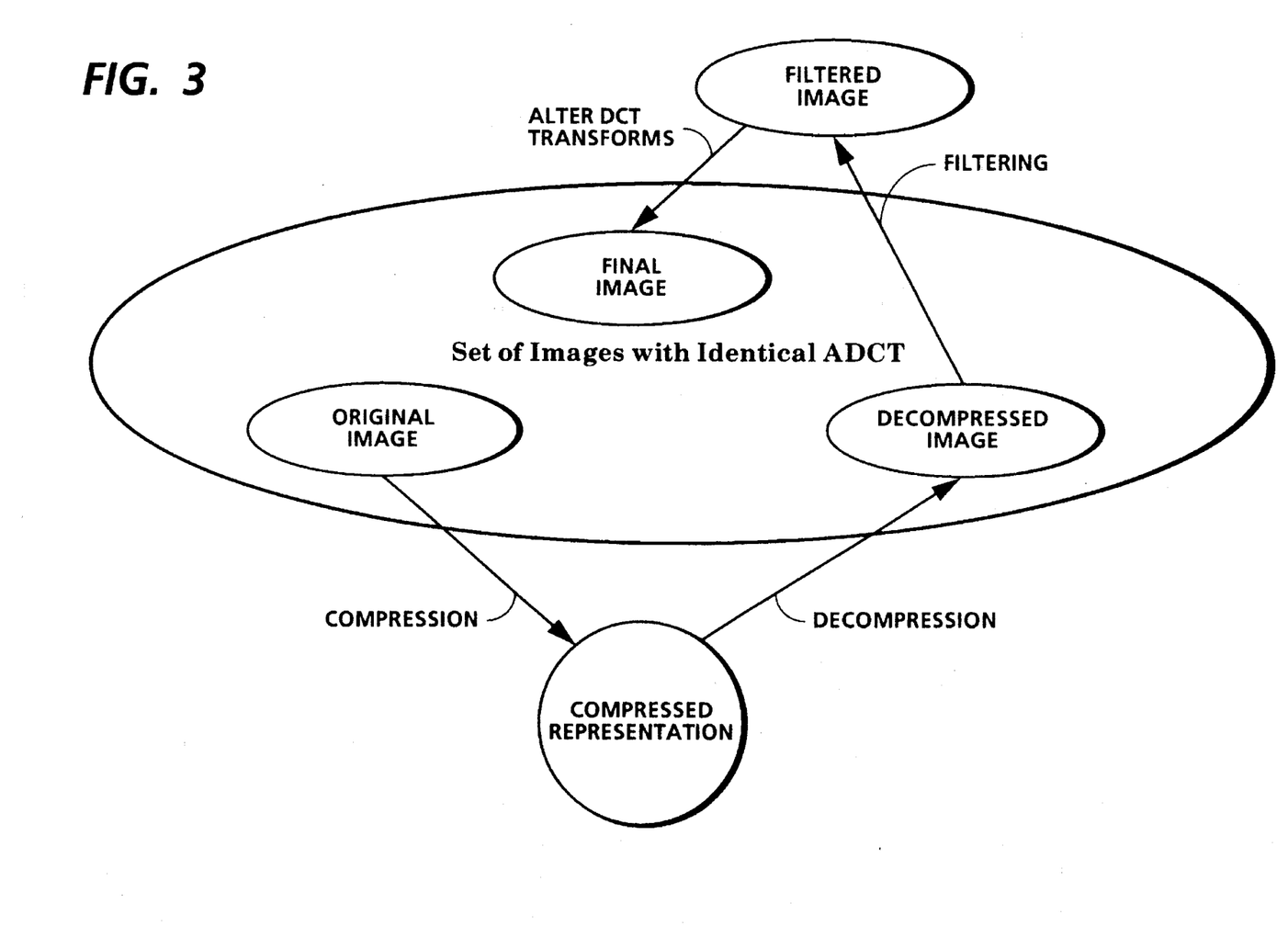
FIG. 3 shows the iterative decompression process with filtering and checking.

FIG. 3 illustrates the principle for the process described in U.S. Pat. No. 5,321,522 to Eschbach, co-pending U.S. patent application Ser. No. 07/956,128 entitled "Decompression of Standard ADCT-Compressed Images" by R. Eschbach, filed Oct. 2, 1992 and assigned to the same assignee as the present invention (published at EP 590922, on Apr. 6, 1994) and U.S. Pat. No. 5,359,676 to Fan, and how these references vary from the standard process described in FIG. 1. The original image is compressed; the compressed representation is decompressed. The decompressed image is additionally filtered to improve appearance, but in doing so, it may be forced outside the range of images that are possibly derived from the original image. The DCT representation of the image is therefore altered, in order to force the image into the acceptable range of images. The processes may be used iteratively.

The process described in these references was developed to improve the quality of JPEG compressed images under the assumption that every block was decompressed in an identical manner, which also means that every block was iteratively processed. This is an approach that works well for hardware applications because no overhead is generated by iterating on blocks that need not be operated upon. In software implementations, however, the actual decompression speed is governed by the number of iterations times the number of blocks the iteration is performed on. A critical element of improving the software performance is the prediction of whether a block is a candidate for iterative post-processing or not.

All of the references cited herein above are incorporated by reference for their teachings.

SUMMARY OF THE INVENTION

In accordance with the invention, there is provided an improved iterative ADCT decompression process, which provides an initial check to determine if iterative processing is required.

In accordance with one aspect of the invention, there is provided a method of decompressing a document image compressed with JPEG ADCT and a subsequent statistical encoding method, including an iterative processing step, which filters the image to correct for compression/ decompression artifacts, and subsequently checks the ADCT coefficients of the filtered image to determine whether the filtered image is a possible one, given the received original ADCT coefficients and Q-Table description. In such an arrangement, the iterative process step can be terminated at a preselected number of iterations based on the measured image attribute prior to removing the statistical encoding.

In accordance with one aspect of the invention, there is provided a method of improving the appearance of a decompressed document image while maintaining fidelity with an original document image from which it is derived, wherein for common ADCT compression, an original document image is divided into blocks of pixels, the blocks of pixels are changed into blocks of transform coefficients by a forward transform coding operation using a frequency space transform operation, the transform coefficients subsequently quantized with a lossy quantization process in which each transform coefficient is quantized according to a quantizing value from a quantization table and the result is used as a quantized transform coefficient, and the blocks of quantized transform coefficients are encoded with a statistical encoding method, the method of decompressing comprising:

a) receiving the statistically encoded, quantized transform coefficient blocks for the original image;

b) counting the number of bits representing each block of pixels in the image;

c) using the counted number to generate an iteration value;

d) removing the statistical encoding to obtain quantized transform coefficients;

e) dequantizing the transform coefficients in a block according to a corresponding quantizing value from the quantization table to obtain a block of received transform coefficients;

f) recovering the image by applying an inverse transform operation to the received transform coefficients;

g) if the iteration number indicates that further appearance improvement is not required, directing the image to an output, and otherwise processing the image with the substeps of:

i) filtering the image to improve the appearance thereof;

ii) changing the filtered image into blocks of new transform coefficients by the forward transform coding operation;

iii) comparing each block of new transform coefficients to the corresponding block of received transform coefficients and the quantization table, to determine whether the filtered recovered image is derivable from the original image; and iv) decrementing the iteration number and returning to f).

Although U.S. Pat. No. 5,321,522 to Eschbach, co-pending U.S. patent application Ser. No. 07/956,128, entitled "Decompression of Standard ADCT-Compressed Images" by R. Eschbach, filed Oct. 2, 1992 and assigned to the same assignee as the present invention (published at EP 590922, on Apr. 6, 1994), addressed the need for terminating iterations, there was no suggestion made as to the basis for such termination on a block by block basis. Additionally, since that time of the invention, it has become evident there is a need to reduce the number of iterations where possible, particularly in software embodiments of the invention. Determining the number of iterations required for any given image block on the basis of the statistical encoding provides a fast, simple way of optimizing decompression performance.

These and other aspects of the invention will become apparent from the following descriptions to illustrate a preferred embodiment of the invention read in conjunction with the accompanying drawings in which.

DETAILED DESCRIPTION OF THE INVENTION

Referring now to the drawings where the showings are for the purpose of describing an embodiment of the invention and not for limiting same, we note initially, that while it is impossible to return to the exact image which was compressed originally in the compression process, because data has been lost in the compression process, it is possible to return to an image which is similar in some respect to the original compressed image, as will be further described with respect to the present invention, hereinafter. Secondly, it is possible to correct the basic image defects that are appearing in the image. With reference to FIG. 2, a general overview of the compression/decompression process is shown. There exists a set of images which are distinct from each other, but which are similar in the respect that each image in the set compresses to the same ADCT representation. Therefore, any decompression process should produce an output image which is within this set. The knowledge of the set of possible images is coded by the Q-Table used. Since the Q-Table represents divisors of the discrete quantized transform coefficients, and as a result of the quantization process fractional portions of each coefficient are discarded, then the set of possible images represents all those images from which the same quantized transform coefficients can be determined about a range of possible coefficient values for each term of the transform. FIG. 3 illustrates the process described in co-pending U.S. patent application Ser. No. 07/956,128, entitled "Decompression of Standard ADCT-Compressed Images" by R. Eschbach, filed Oct. 2, 1992 and assigned to the same assignee as the present invention, and U.S. Pat. No. 5,359,676 to Fan. The original image is compressed; the compressed representation is decompressed. The decompressed image is filtered to improve appearance, but in doing so, it might be forced outside the range of images that are possibly derived from the original image. The DCT representation of the image is therefore altered, in order to force the image into the acceptable range of images.

Figure 4:
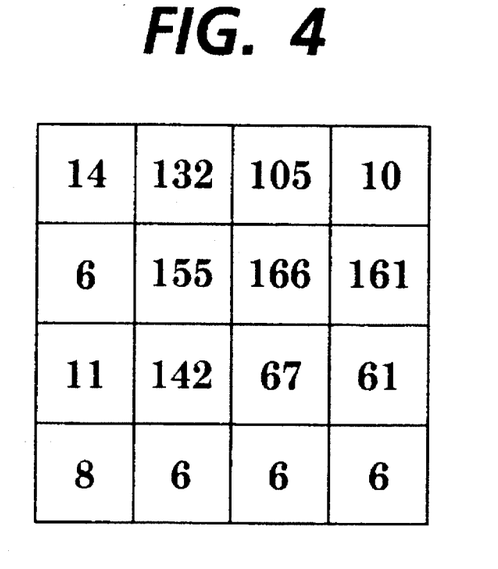
FIG. 4 shows an example set of Huffman Code lengths for an image.
Figure 5:
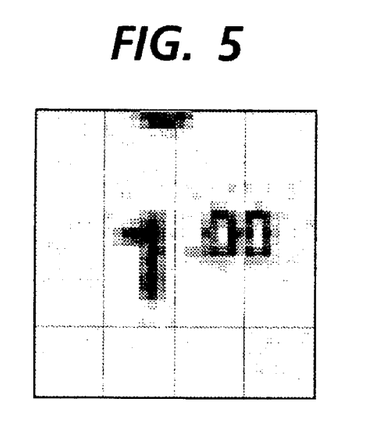
FIG. 5 shows a standard JPEG decompression of the image with the Huffman encodings of FIG. 4.

In accordance with the invention, it has been discovered that the statistical encoding can be used as an indicator for ADCT artifacts. In the following we will use the term Huffman encoding in place of statistical encoding, since the Huffman coder is likely the most wide-spread statistical coder. The suitability of data obtained at the Huffman decoder for image noise estimation can be understood by considering the motivation for JPEG compression and Huffman coding i.e., to generate a compact description of the image data. Reversing the argument, blocks not having a compact Huffman description are likely to have violated one or more of the assumptions JPEG is based upon. This can best be seen from the example in FIG. 4. For an example 32 by 32 pixel area in the form of 4 by 4 blocks of 8 by 8 pixels, the length of the Huffman encoding for every block is given. The numbers in the table of FIG. 4, represent the number of binary signals required to represent the value. We refer to the number as the Huffman code length. FIG. 5 shows the actual decompressed image for this area, using the standard ADCT process without filtering or checking.

From FIGS. 4 and 5, the correlation between image noise and the length of the Huffman code is clear. Understanding this correlation, the length of the Hoffman code can be used to assess the number of iterations that should be performed per block. For a standard JPEG quantization table (Q Table), a reasonable dependency of the number of iterations on the Huffman code length is:

6≦Huffman code length<80→0 iterations

80≦Huffman code length<120→1 iteration

120≦Huffman code length→3 iterations.

Clearly, other relationships can be used. Also it should be noted that the number of iterations is a function of the convergence speed of the iterative decompression algorithm. The numbers given here are reasonable numbers using the filter described in co-pending U.S. patent application Ser. No. 07/956,128, entitled "Decompression of Standard ADCT-Compressed Images" by R. Eschbach, filed Oct. 2, 1992, and assigned to the same assignee as the present invention. The numbers would be different when using the improved filtering process described in U.S. Pat. No. 5,359,676 to Fan.

Figure 6:
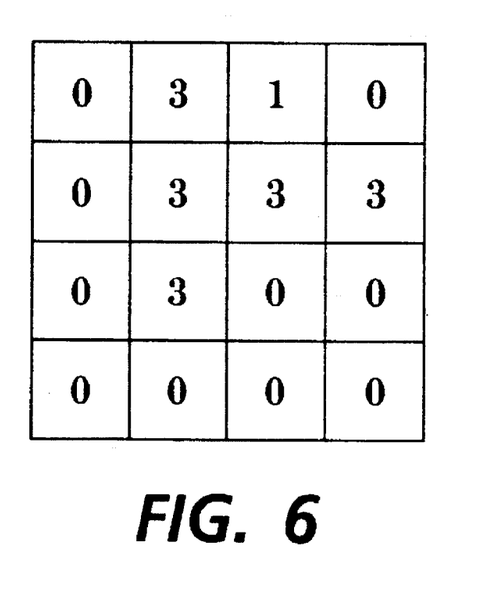
FIG. 6 shows the iteration count derived from the Huffman encoding.
Figure 7:
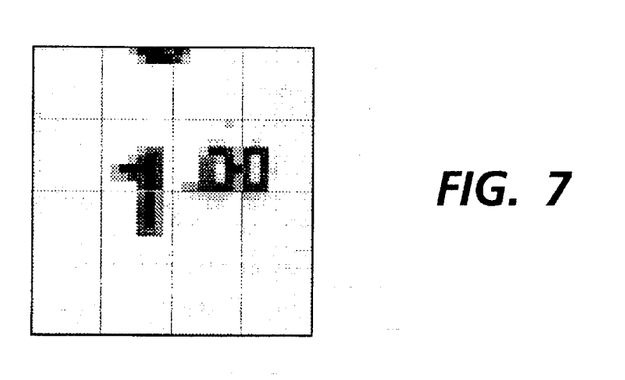
FIG. 7 shows a 32×32 pixel image area, enlarged, processed in accordance with the inventive decompression method.
Figure 8:
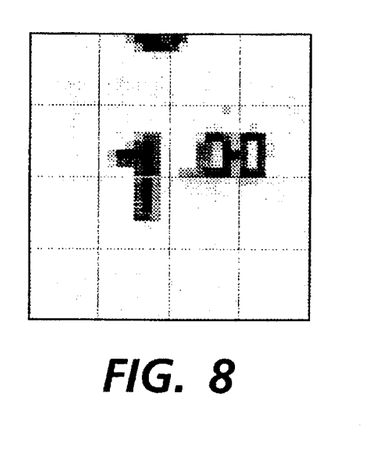
FIG. 8 shows a 32×32 pixel image area, enlarged, processed in accordance with the decompression method of FIG. 7, but fixing the iterations for each block at 3.

With these settings, the number of iterations per 8×8 image block would be as illustrated in FIG. 6. The total number of interactions for the 32×32 area would be 16. FIG. 7 illustrates the appearance of the image using the determined 16 block-iterations. By contrast, FIG. 8 illustrates the appearance of the page with a preset 3 iterations per block, providing 48 block-iterations. It can be seen that there is little difference between the two images, but the result of FIG. 7 was obtained using ⅓ the total number of iterations of FIG. 8. The reduction of the number of block-iterations from 48 to 16 results in a clear improvement in software processing speed.

Figure 9:
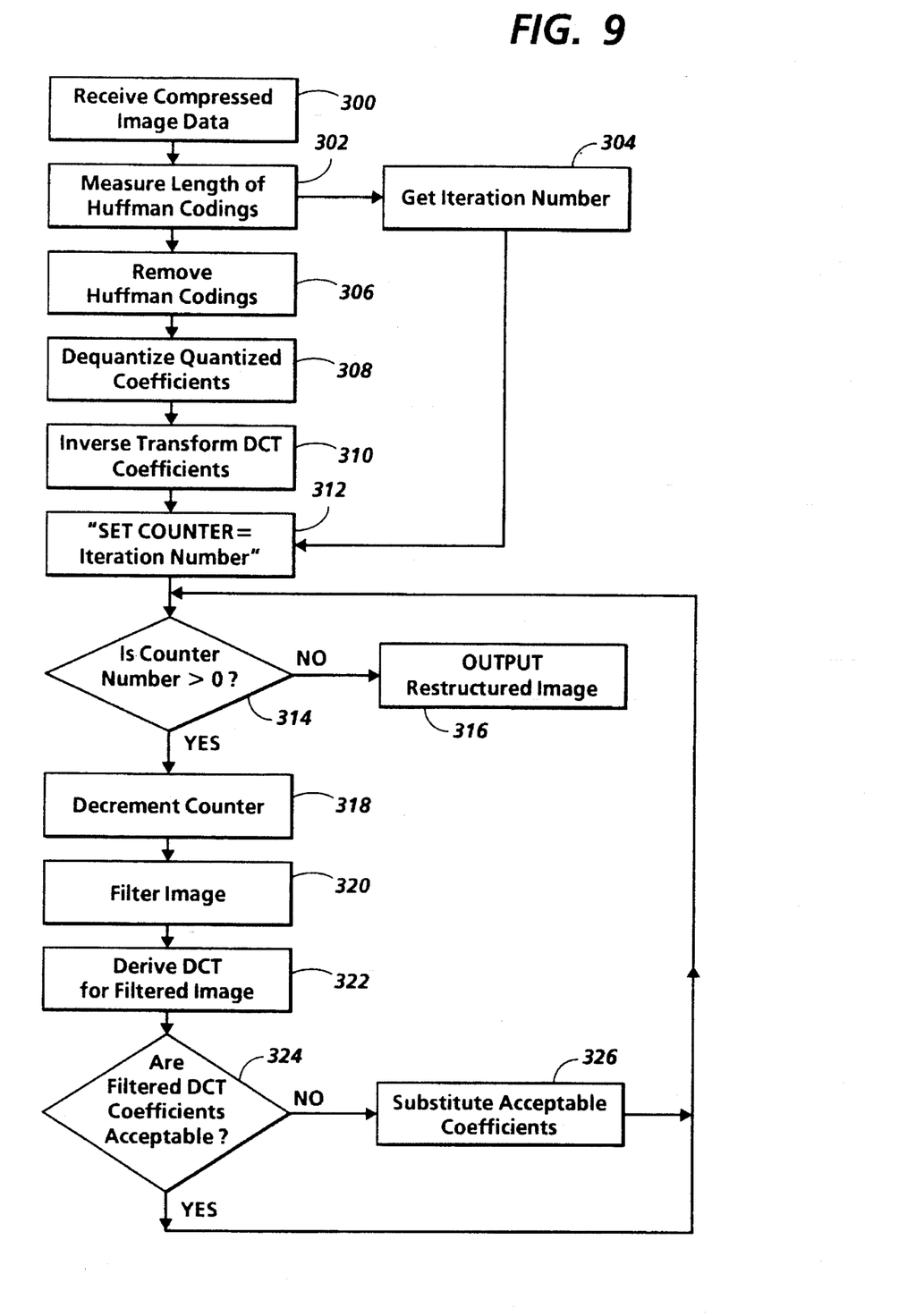
FIG. 9 shows a flow chart of the efficient iterative decompression process forming the invention.

With reference now to FIG. 9, a flow chart of the iterative ADCT decompression/reconstruction is provided, showing the additional operations of the present invention. An image compressed in accordance with the ADCT compression method with statistical encoding is obtained at step 300 at a system input. The length of the Huffman encoding is measured in terms of the number of bits forming each image block, probably via a bit counter, reset for each 8×8 block received. At step 304, the measured value is used to obtain an iteration number, probably from a look up table stored in ROM or RAM memory, or the like. The statistical encoding is removed at step 306 to obtain quantized DCT coefficients. At step 308, the quantized DCT coefficients are multiplied by values in the Q table to obtain the set of DCT coefficients. At step 310, the inverse transform of the DCT coefficients is derived to produce the gray level image. The steps 300, 306, 308 and 310 outline the standard ADCT decompression. At step 312, a counter register is set to the iteration number, to keep track of iterations performed. At step 314, the counter value is checked. If the counter is equal to 0, either because the iteration number was equal to 0, or because the counter has be decremented to 0, the image from step 310 is output at step 316. However, if the counter is greater than 0, an iterative process is pursued to filter and check the DCT coefficients. At step 318 the counter is decremented to keep track of the iterations. At step 320, the image is filtered to remove undesirable artifacts. The filtered image DCT coefficients are compared to the DCT coefficients obtained at step 312 and an acceptable range about each value defined by the Q table. At step 324, if the filtered image DCT coefficients are within the acceptable range about each value, then the loop is continued. This is an unlikely scenario, but it keeps undesirable changes from being made to the image. If the filtered image DCT coefficients are not within the acceptable range about each value, then at step 326, acceptable values are substituted for out-of-range values, and the loop is continued to check the iteration number at step 314.

The process has been described in a manner which prevents filtering of the image, if the Huffman code is of a minimal length. However, the filter types proposed at copending U.S. patent application Ser. No. 07/956,128 entitled "Decompression of Standard ADCT-Compressed Images" by R. Eschbach, filed Oct. 2, 1992 and assigned to the same assignee as the present invention (published at EP 590922, on Apr. 6, 1994), and U.S. Pat. No. 5,359,676 to Fan, generally would not be detrimental for a single processing of the image, and accordingly, the process can be set to prevent iterative processing, but allow a single pass of the image through the filter.

The invention has been described with reference to a particular embodiment. Modifications and alterations will occur to others upon reading and understanding this specification.

I claim:

1. A method of improving the appearance of a decompressed document image while maintaining fidelity with an original document image from which it is derived, wherein for compression, an original document image is divided into blocks of pixels, said blocks of pixels are changed into blocks of transform coefficients by a forward transform coding operation using a frequency space transform operation, said transform coefficients subsequently quantized with a lossy quantization process in which each transform coefficient is quantized according to a quantizing value from a quantization table and the result is used as a quantized transform coefficient, and said blocks of quantized transform coefficients are encoded with a statistical encoding method, the method comprising:

a) receiving said statistically encoded, quantized transform coefficient blocks for said original image;
   b) counting the number of bits representing each block of pixels in said image;
   c) using said counted number to generate an iteration value;
   d) removing said statistical encoding to obtain quantized transform coefficients;
   e) dequantizing the transform coefficients in a block according to a corresponding quantizing value from the quantization table to obtain a block of received transform coefficients;
   f) recovering the image by applying an inverse transform operation to the received transform coefficients;
   g) if said iteration number indicates that further appearance improvement is not required, directing the image to an output, and otherwise processing the image with the substeps of:
      i) filtering the image to improve the appearance thereof;
      ii) changing the filtered image into blocks of new transform coefficients by the forward transform coding operation;
      iii) comparing each block of new transform coefficients to the corresponding block of received transform coefficients and the quantization table, to determine whether the filtered recovered image is derivable from the original image; and
      iv) decrementing the iteration number and returning to f).

2. A method as described in claim 1, wherein the forward transform coding operation using the frequency space transform operation is a discrete cosine transform.

3. A method as described in claim 1, wherein substep iii) includes the additional steps of:
   1) determining that the block of new transform coefficients is not derivable from the original image; and
   2) altering individual new transform coefficients, so that a block of altered new transform coefficients is derivable from the original image.

4. A method of improving the appearance of a decompressed document image while maintaining fidelity with an original document image from which it is derived, wherein the document image was originally compressed with the JPEG ADCT method, including statistically encoding transform coefficients therefrom, the method including:

a) receiving statistically encoded, quantized transform coefficient blocks for said original image;
   b) counting a number of bits representing each block of pixels in said image;
   c) using said counted number to generate an iterative processing amount;
   d) decoding the image from the statistical encoding;
   e) recovering the image from the quantized transform coefficients;
   f) filtering the image for a predetermined number of iterations in accordance with the transform amount; and
   g) for each filtering iteration
      i) changing the filtered recovered image into blocks of transform coefficients by the forward transform coding operation;
      ii) comparing each block of transform coefficients to a corresponding block of received transform coefficients and the selected quantization table, to determine whether the filtered recovered image is derivable from the original image; and
      iii) upon said determination, returning to e).

5. A method as described in claim 4, wherein g) iii) includes:
   1) determining that the block of new transform coefficients is not derivable from the original image; and
   2) altering individual new transform coefficients, so that a block of altered new transform coefficients is derivable from the original image.

* * * * *